(12) United States Patent
Stahr

(10) Patent No.: US 8,399,798 B2
(45) Date of Patent: Mar. 19, 2013

(54) METHOD FOR INCORPORATING A STRUCTURE INTO A SURFACE OF A TRANSPARENT WORKPIECE

(75) Inventor: Christoph Stahr, Bad Aibling (DE)

(73) Assignee: Panasonic Electric Works Europe AG (DE)

( * ) Notice: Subject to any disclaimer, the term of this patent is extended or adjusted under 35 U.S.C. 154(b) by 668 days.

(21) Appl. No.: 12/596,521

(22) PCT Filed: Apr. 10, 2008

(86) PCT No.: PCT/EP2008/002840
§ 371 (c)(1),
(2), (4) Date: Dec. 1, 2009

(87) PCT Pub. No.: WO2008/125273
PCT Pub. Date: Oct. 23, 2008

(65) Prior Publication Data
US 2010/0108651 A1 May 6, 2010

(30) Foreign Application Priority Data

Apr. 17, 2007 (DE) .......................... 10 2007 018 402

(51) Int. Cl.
*B23K 26/00* (2006.01)
(52) U.S. Cl. ............ 219/121.6; 219/121.61; 219/121.62; 219/121.64; 219/121.68; 438/690; 438/795
(58) Field of Classification Search ................ 219/121.6, 219/121.62, 121.64, 121.68, 121.69, 121.7, 219/121.73, 121.78, 121.82
See application file for complete search history.

(56) References Cited

U.S. PATENT DOCUMENTS

| | | | |
|---|---|---|---|
| 5,761,111 A | 6/1998 | Glezer | |
| 6,132,818 A | 10/2000 | Tanaka et al. | |
| 2004/0188399 A1 | 9/2004 | Smart | |
| 2007/0051706 A1* | 3/2007 | Bovatsek et al. | ........ 219/121.69 |

FOREIGN PATENT DOCUMENTS

| CN | 1187405 A | 7/1998 |
|---|---|---|
| CN | 1603888 A | 4/2005 |

(Continued)

OTHER PUBLICATIONS

Brian Concannon; "International Search Report"; PCT/EP2008/002840; Jul. 11, 2008.

*Primary Examiner* — Hsien Ming Lee
(74) *Attorney, Agent, or Firm* — Studebaker & Brackett PC; Donald R. Studebaker

(57) ABSTRACT

The invention relates to a method for incorporating a structure into a surface of a workpiece that is transparent in a certain wavelength range. For this purpose the surface to be structured is brought into contact with a target surface containing a target material by means of a laser beam, the wavelength of which is within the certain wavelength range, energy is introduced at least at one position through the workpiece and into the boundary region of the surface to be structured and the target surface such that target material is deposited at the respective position in and/or on the surface to be structured. For this purpose a pulsed laser beam having a pulse repetition rate of more than 10 kHz is used, which is focused such that the focus is positioned on or under the target surface, wherein the laser beam has a power density in the focus of more than 2000 W/mm$^2$. The invention further relates to a device for introducing a structure into a surface of a workpiece transparent in a certain wavelength range.

22 Claims, 2 Drawing Sheets

FOREIGN PATENT DOCUMENTS

| | | |
|---|---|---|
| DE | 19517625 A1 | 11/1996 |
| DE | 102006029941 A1 | 11/1996 |
| EP | 0761337 A | 3/1997 |
| JP | 2004-250786 A | 9/2004 |
| WO | 95/25639 A1 | 9/1995 |
| WO | 03/022506 A | 3/2003 |

* cited by examiner

METHOD FOR INCORPORATING A STRUCTURE INTO A SURFACE OF A TRANSPARENT WORKPIECE

The invention relates to a method for incorporating a structure into a surface of a workpiece which is transparent at a specific wavelength range, wherein, the surface to be structured is brought into contact with a target surface containing a target material and wherein using a laser beam, the wavelength of which is within the specified wavelength range, energy is introduced through the workpiece into the boundary region of the surface of the workpiece to be structured and the target surface, at least at one position, such that, at the relevant position, target material is deposited in the surface to be structured. Moreover, the invention relates to a corresponding apparatus for carrying out this method.

By way of incorporating an appropriate structure into a workpiece surface, the relevant workpiece can be marked, for example. Available for this are now customary laser inscription systems or laser marking systems which can be used to incorporate, in the form of a marking, into the surface of the relevant workpiece various structures, such as an inscription, a machine-readable coding such as a barcode or any other graphic element. Such systems can also be used to mark a wide variety of materials, in particular including transparent materials such as glass or Plexiglas, as long as suitable lasers are used. Typically a laser beam, the light of which is absorbed as well as possible by transparent material, is used for marking the transparent materials. By way of example, glass has a transmission range for light wavelengths between about 180 nm and about 2500 nm. Therefore, $CO_2$ lasers having a wavelength of 10 600 nm, 9600 nm or 9300 nm are currently used, among others, for glass marking. The mode of operation is as follows: the laser is focussed at the point to be marked in or on the surface of the relevant workpiece and thus as much energy as possible is introduced into the workpiece at this point. As a result, "micro-cracks" result in a localized fashion at the relevant point in the workpiece material, which micro-cracks can then be seen in the transparent material. As an alternative, an engraving can be made in the surface. Here, the local material is removed from the surface of the workpiece to be marked. In order to render it more visible, this engraving can, for example, be implemented using an opaque material. Incorporating this material into an engraving, however, requires an additional work step. Other possible marking methods are conventional printing methods which are used to apply writing or another graphic element onto the surface. One disadvantage of these printing methods is that the marking can relatively easily be destroyed.

DE 195 17 625 A1 describes, as an alternative, a method of the type mentioned in the introduction, in which a pigment-containing layer is applied onto a surface of a solid transparent substrate, for example, glass in order to print a pattern onto the relevant surface. Said layer is then irradiated by a laser, through the substrate, such that the layer material transfers to the substrate surface. The prints thus achieved adhere very strongly to the surface and are resistant to acids and bases, it being assumed in said document that particles of the layer material probably also diffuse into the surface during the printing operation.

Furthermore, a similar method is described in WO 95/25639, in which a marking is produced on a transparent workpiece by introducing energy locally through the workpiece into a target using a laser, with the result that the target material evaporates and deposits locally on the surface to be marked of the transparent workpiece. The target in this process does not bear directly against the surface to be marked but is positioned, for example, at a distance of 0.1 mm from the surface to be marked in order to achieve the best results with this vapor deposition method.

DE 196 37 255 C1 describes another similar method, in which a surface to be written on of a transparent material is positioned at a short distance from a substrate material which is made of ceramic substrate particles and a binder. A laser is used to irradiate the substrate material locally through the transparent material. Here, the laser is focussed onto the surface to be written on. The laser energy introduced into the substrate material ensures that the binder evaporates. The substrate particles which are freed in the process can pass into the focus of the laser beam onto the surface to be written on and, due to the high energy density, are sintered.

Since sintering of substrate particles during later post-treatments of the transparent material could be disadvantageous, DE 10 2006 029 941 A1 suggests a modified method. Here, the substrate used is exclusively a metal or a semi-metal such as silicon. It is positioned either in direct contact with the surface to be written on or, preferably, at a short distance from said surface. The laser beam which is again directed through the transparent material onto the substrate is adjusted such that particles of the substrate evaporate and condensate on the surface to be written on, without diffusion of particles of the substrate material into the transparent material taking place. For this, a pulsed laser beam with a pulse repetition rate of at most 1 kHz, a mean power of 8.4 W or 12 W, a focus diameter of 42 μm and a deflection speed of 50 mm/s is used. In this case, the laser beam is preferably focussed onto the surface to be written on of the transparent material. In one variant of the method, the transparent material in the surface to be written on is additionally locally ablated and/or melted. For this, a laser beam having a pulse repetition rate of at most 0.4 kHz, a mean power of 12 W, a focus diameter of 42 μm and a deflection speed of only 20 mm/s is used, for example.

It is an object of the present invention to specify an alternative method and a corresponding apparatus for incorporating a particularly stable structure into the surface of a transparent workpiece.

This object is achieved by way of a method as claimed in patent claim 1 and by way of an apparatus as claimed in patent claim 14.

Thus, according to the invention, in a method of the type mentioned in the introduction, a pulsed laser beam with a pulse repetition rate of more than 10 kHz is used. It is focussed such that the focus is located on or under the target surface, the laser beam in the focus having a power density of more than 2000 W/mm². The power density is here the mean laser power in relation to the focus area.

By focussing onto the target surface or in the target, for example just under the target surface, a large portion of the energy is introduced into the target. Furthermore, a considerably higher pulse repetition rate is used than in said prior art, simultaneously producing a high power density. Correspondingly, the pulses are here relatively short due to the high pulse repetition rate. Owing to the short but intensive laser pulses, the target particles thus pass onto the surface of the transparent workpiece, in the mean, with a relatively high energy and can thus penetrate said surface.

Thus, unlike in the abovementioned prior art, a deliberate attempt is made here to achieve, in addition to the application of target material onto the workpiece surface, as good a diffusion as possible of target material into the workpiece surface, and the method is deliberately not adjusted such that target material deposits virtually exclusively on the surface of the material to be structured.

It has been found in various experiments that it is possible when using this method to incorporate target material onto and into the surface of the transparent workpiece particularly well, such that a permanent structure, which can be easily seen and can be removed only with great difficulty (e.g. by abrasion or grinding of the surface), can be produced in this way.

A suitable apparatus for incorporating a structure in a workpiece surface as per the method according to the invention requires, in addition to a target material-containing target surface, which can bear, for example, against the surface to be structured of the workpiece or onto which the workpiece can be placed, a suitable laser beam generation device for generating a laser beam the wavelength of which is within the wavelength range in which the workpiece is transparent. The laser beam generation device must be designed and arranged such that energy can be introduced into the boundary region of the surface to be structured of the workpiece and the target surface at least at one position using the laser beam through a workpiece, which is in contact with the target surface, such that at the relevant position target material is deposited in the surface to be structured. The laser beam generation device is designed here according to the invention such that it generates a pulsed laser beam with a pulse repetition rate of more than 10 kHz and that it has a focussing device, such as a suitable objective, and a control device which focuses the laser beam during the structuring process onto or just under the target surface, the laser beam in the focus having a power density of more than 2000 W/mm$^2$.

In addition, the apparatus or the laser beam generation device can have a suitable control device which ensures not only the desired setting of the focussing parameters, such as position and diameter of the focus, but also the setting of other laser parameters, such as pulse repetition rate or power. This control device can consist of a central control unit or of a plurality of control units which are connected to one another in a suitable manner for communication.

Other particularly advantageous embodiments and developments of the invention can be gathered from the dependent claims and the following description. The apparatus according to the invention can here also be developed in accordance with the dependent method claims and vice versa.

The method can be used to incorporate a structure in surfaces of a wide variety of transparent materials such as various glasses, Plexiglas etc. It is with particular preference suitable for incorporating structures in surfaces of glass workpieces, since this is possible only with great difficulty if other means are used and the structures which are created in glass materials using the method according to the invention are particularly durable.

A wide variety of materials can also be used as the target materials. Experiments have shown that metals such as copper, aluminum, in particular Titanal (a specific aluminum alloy), titanium etc. are highly suitable. Steels are particularly suitable, preferably stainless steels such as V2A, in which a very good visual recognizability of the structure can be achieved even at a lower laser power.

The target material can also be applied onto the workpiece surface, and then removed again, particularly preferably in the form of a film, e.g. a metal film or a metal-containing or pigment-containing film, before the structuring process. Very particularly preferably, it can be a self-adhesive film.

If the target material is a conductive material, this method can also be used to apply any conductive structures onto a glass surface or a surface of another transparent material.

One preferred use of the invention is the marking, as explained in the introduction, of workpieces with structures in the form of writing, logos etc. Alternatively, or additionally, the structures introduced in the manner according to the invention can also be used for completely different purposes. For purely visual reasons or design reasons, for example, it is possible to incorporate into the surface artistic embellishments, areal structures, photographic images etc.

Another preferred application example is the application of technical conductor track structures, such as antenna structures or heating conductors, which is of interest in particular for panes in motor vehicles.

The wavelength of the laser beam—i.e. the wavelength of the light of said laser beam—should preferably be in a range of about 180 nm to about 2500 nm, particularly preferably in a range of about 300 nm to about 1800 nm. In the marking of glass workpieces, in particular, the use of a laser having a wavelength of about 1060 nm has proven useful. A laser having such a wavelength is, for example, a "FAYb laser" (fiber amplified ytterbium laser). Nd-YAG lasers (neodymium-doped yttrium-aluminum-garnet laser) having wavelengths of 1064 nm or 532 nm can also be used to good effect.

Furthermore, the laser beam generation device preferably has a beam guidance device in order to move the laser focus along a structuring track defined according to a structuring image. That means that the laser is moved, step-wise or continuously, in a point-type manner along said structuring track, for example along a text, at a specified advancing rate in order to thus generate the desired structuring image.

Preferably, the advancement takes place at an advancing rate of more than 70 mm/s, particularly preferably of more than 100 mm/s, depending on the specific application possibly even considerably faster.

Such a beam guidance device can have any desired design. For example, the laser can be guided via an optical waveguide and said optical waveguide is appropriately adjusted by way of suitable setting devices. The beam guidance device, however, can likewise have a usual design having deflecting units, for example two deflecting mirrors, prisms or the like. In order to ensure, on the basis of such a system, that the focus of the laser beam remains in each case in one plane directly on or under the target surface, the focussing device must have a corresponding design. To this end, for example the use of a plan field objective having an F-Theta lens or the like suggests itself. Such an F-Theta objective focuses the laser beam onto a planar image field plane. Here, there is an exact proportionality between the angle of incidence of the beam and the position of the focussed image point in the image field, i.e. in the plane in which the structuring is to take place. Likewise, suitable 3D objectives can also be used, for example if the surface to be structured is curved. Suitable deflecting units having integrated focussing objectives are commercially available for example for use in customary laser engraving or laser marking apparatuses. These can also be used for the apparatus according to the invention. Likewise, the control systems provided for said devices can also be used. It is, however, necessary that a suitable laser is used having a wavelength at which the material to be structured is transmissive and that the control system is set such, if appropriate even suitably programmed for an automatic control, that the focus is not located in the workpiece to be structured itself, but for example on or just under the target surface.

As already explained in the introduction, the structuring process is deliberately designed according to the invention such that particles of the target material diffuse into the surface to be structured of the transparent workpiece as well as possible. The structuring is therefore preferably carried out such that particles of the target material penetrate the surface to be structured at least at one point with the largest penetration depth—for example in the case of a point mark in the center of the point mark, or of a line mark along a center line of the line mark—being at least about 15 μm, preferably at least about 30 μm. In the test marks carried out hitherto, it has been found that the method according to the invention can be used to easily achieve a penetration depth of the target particles into the workpiece surface of up to 30 μm and more.

Preferably, for as short a period of time as possible, high energy should additionally be introduced in the target. Here, the laser beam is preferably controlled such that the temperature in the surface to be structured even during structuring is below the melting temperature of the workpiece material, and specifically also in the direct boundary region with respect to the target surface in which the laser beam focus is situated at present.

That is to say that the workpiece surface is not supposed to be melted locally. The melting temperature of glass is, depending on the type of glass, between about 1000° C. and about 1600° C.

On the other hand, the temperature in the workpiece surface to be currently marked should not be too low either since a higher temperature benefits the diffusion. A temperature above about 600° C. is particularly preferred.

Setting the optimum conditions is carried out by adjusting various parameters, those which determine the energy introduced into the target by the laser beam and those which determine the time during which said energy is introduced.

It has proven advantageous if the laser beam in the focus has as high a power density as possible. Therefore, the laser beam is preferably adjusted such that in the focus it has a power density of more than about 3 kW/mm$^2$, particularly preferably more than about 10 kW/mm$^2$, very particularly preferably even more than about 100 kW/mm$^2$.

For this, firstly the focus diameter must be sufficiently small. A focus diameter is preferably set such that it is less than 60 μm, particularly preferably less than 40 μm. In tests, for example, excellent markings having a focus diameter of only about 30 μm have been achieved.

Secondly, the average power of the laser must be sufficiently high. For example, it should be more than 10 W. A laser whose average power can be set between 10 W and 50 W is used with preference. In the case of a focus diameter of about 60 μm, a power of 12 W suffices in order to achieve a power density in the focus of more than 4 kW/mm$^2$.

In addition to the power introduced, however, the advancing rate, already defined above, and the pulse repetition rate of the laser beam also play a role for the temperature behavior in the target—and thus also in the adjoining workpiece surface. According to the invention, operation is carried out at a relatively high pulse repetition rate of more than 10 kHz. Preferably a pulse repetition rate of more than 20 kHz, particularly preferably of between 20 kHz and 100 kHz is used. This equals a pulse repetition time of between 10 μs and 50 μs.

According to this short pulse repetition time, the laser pulses themselves must also be relatively short. The pulse duration of the laser pulses is preferably shorter than 100 ns, particularly preferably shorter than 20 ns. Since as short a pulse duration as possible is advantageous, a pulse duration in the ps range or below is very particularly preferred.

The short pulse durations, with a specified medium power, results in correspondingly high laser pulse peak power (or "laser peak power"). In the method according to the invention, operation takes place preferably with a laser pulse peak power of more than 10 kW, particularly preferably more than 25 kW. Consequently, it is then ensured that as much energy as possible within as short a time as possible is introduced into the target material in order to provide the particles of the target material with sufficient energy and also to maintain the temperature in the workpiece to be marked within the desired temperature limits even locally and thus to achieve as good a diffusion as possible of target particles into the workpiece surface.

The invention will be explained again in more detail below with reference to the attached figures on the basis of an exemplary embodiment. Further details and advantages of the invention will emerge herefrom. In the figures.

It will be assumed below—without limiting the invention to said use—that the incorporation of the structure into the surface serves for marking the workpiece. As mentioned, the method according to the invention can also be used to incorporate into the surface structures for other purposes, such as technical conductor track structures or graphic areas.

Figures 1, 2:
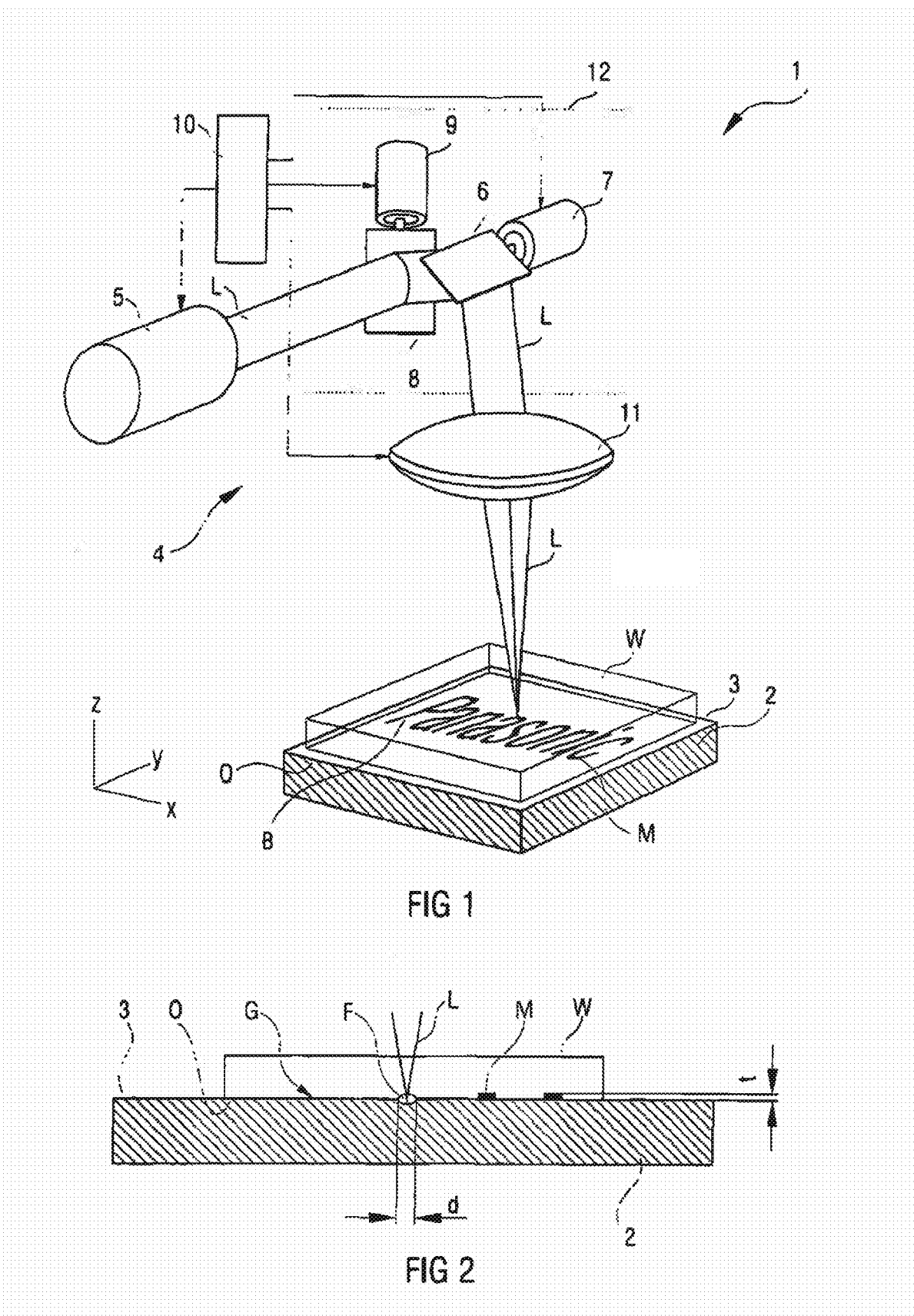
FIG. 1 shows a schematic of an exemplary embodiment of an apparatus according to the invention during the marking of a glass workpiece.
FIG. 2 shows a section through the glass workpiece with the target, located thereunder, during incorporation of the marking.

The exemplary embodiment of an apparatus according to the invention shown in FIG. 1 is basically a conventional laser inscription device which—as will be explained below—has been modified for use with the method according to the invention.

It is an essential point here that, located below the workpiece W to be marked, is a target 2, for example a steel plate 2 or a steel film, onto which the workpiece W to be marked is placed by way of the surface O to be marked. The surface of the steel plate 2 or steel film, on which as large an area of the surface O to be marked of the workpiece as possible is placed within that region in which the marking M is to be applied, forms the target surface 3.

Furthermore, a laser beam generation device 4 having a laser beam source 5 is used, which generates a laser beam L having a wavelength at which the workpiece W is transmissive. The transmission range of glass is between 180 nm and 2500 nm. Therefore, an FAYb laser having a wavelength of λ=1060 nm is preferably used here.

The laser beam generation device 4 has, in addition to the laser beam source 5, a beam guidance device 12 in the form of a deflecting unit 12 having two deflecting mirrors 6, 8 which are actuated by way of actuation motors 7, 9 and which ensure tilting of the laser beam L in two perpendicular directions. Coupled to this beam guidance device 12 or deflecting unit 12 is a focussing device 11, for example a plan field objective or F-Theta objective 11 having an F-Theta lens. FIG. 1 shows the focussing device 11 schematically only by way of the F-Theta lens. The deflecting unit 12 can be designed together with said F-Theta objective 11 as one unit. It is the task of the F-Theta objective 11 to focus the laser beam L, which has been deflected by the deflecting mirrors 6, 8 at a specific angle, into a plane-parallel plane which extends, in the coordinate system shown in FIG. 1, in the x and y directions and is located here preferably exactly on the target surface 3. Depending on the setting of the deflecting mirrors 6, 8, another point in said x-y plane is struck here. In this manner, by adjusting the actuation motors 7, 9 or the deflecting mirrors 6, 8, the focus F of the laser beam L can move in any manner along a specific marking track defined by the marking image B, here for example the text "Panasonic". It is possible here to use suitable stops or the like to briefly stop the laser beam L, for example in order to jump, in non-adjoining letters in such a text, from one letter to the next without this region being marked.

The complete deflecting unit 12 with the F-Theta objective 11 can also be a commercially available unit, as has been used in prior art laser inscription systems. The laser beam source 5 and the deflecting unit 12 with the F-Theta objective 11 are actuated by way of a control unit 10. In this case, too, a commercially available control unit 10 can be used, which must be programmed appropriately so that the focus F, which can be set automatically by the control unit 10, is set as intended onto the target surface 3 or just under the target surface 3.

Energy is thus introduced, locally in the region in which the laser beam L is currently situated or around said region, into the boundary region G of the surface O to be structured of the workpiece W and the target surface 3, i.e. both into the target and into the workpiece surface O, with the main portion of the energy first being introduced in the focus F on the target surface 3. The metal is, in this way, heated to such a degree that metal particles deposit on the glass surface O and penetrate the latter. This is shown schematically in FIG. 2.

Figure 3:
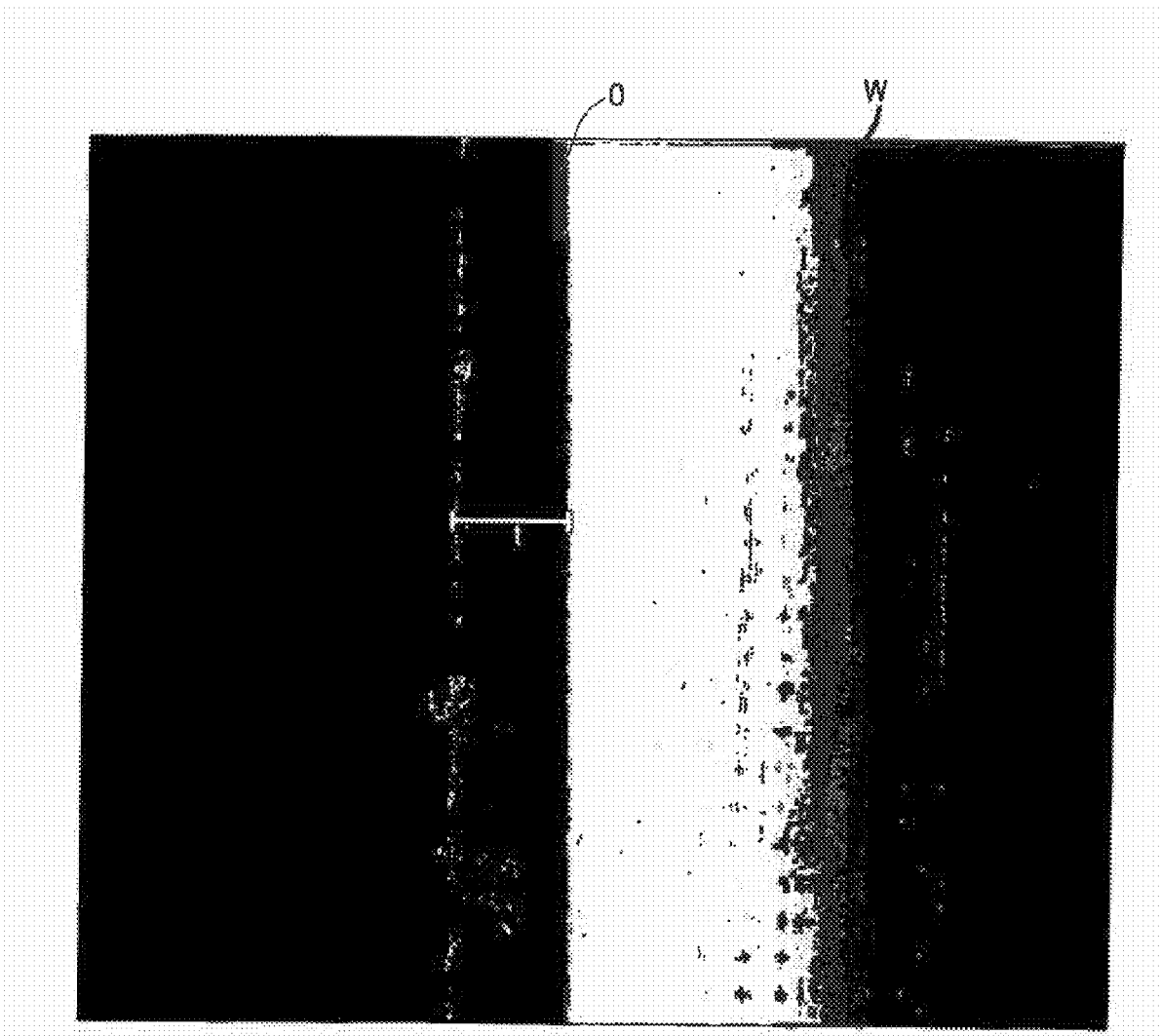
FIG. 3 shows a ground section through a glass workpiece which has been marked using the method according to the invention in the region of the marking, for determining the penetration depth of the target particles.

Experiments have shown that at one marking, the penetration depth t of the metal particles into a glass substrate can be more than 30 μm. FIG. 3 shows a ground section (500 times magnification) in which the diffusion channels and the penetration depth can be seen. At one point, the penetration depth t was measured. It is here about 48 μm.

For these experiments, an FAYb laser having an average power of 12 Watt was used. This is a pulsed laser having a laser peak power of up to 20 kW with a pulse of 20 ns duration. The pulse repetition time can be set in this system to be from 10 μs to 50 μs. The laser is a "single mode laser" (mode TEM00) and has a quality factor M2=1.4. In the tests, the objective was positioned 190 mm from the target surface 3 and the focus F was set directly onto the target surface 3. The beam diameter d in the focus F is then about 60 μm (see FIG. 2). For this setting, the laser in the focus has a power density of about 4000 W/mm$^2$.

In particular experiments were carried out with various metals and have led to markings which are very legible. For example, experiments with copper and with Titanal as the target material were carried out, where the laser power was in each case 10 Watt, the advancing rate in each case 70 mm/s and the pulse repetition time in each case 50 μs. The marking M was, under these conditions, very legible in the case of both target materials. In another experiment, aluminum was used as the target material. With a laser power of 10 Watt and an advancing rate of 80 mm/s and a pulse repetition time of 50 μs, the marking produced here was also quite well legible.

It has been found here that, in principle, metal films, such as aluminum film, can be used as target materials. For example, markings, which were very legible, were achieved in the case of a use of aluminum film with a laser power of 5 Watt, an advancing rate of 1000 mm/s and a pulse repetition time of 50 μs. The use of metal film is, under specific production conditions, advantageous if specific positioning of the workpiece to be marked on a target surface is too complicated and a metal film can be applied, within the production process, relatively easily on the workpiece.

The best results have been achieved with steel. Here, particularly legible markings have been produced with a power of only 8 Watt and an advancing rate of 150 mm/s at a pulse repetition time of 50 μs.

The workpieces thus marked were then tested with regard to destructibility of the markings. It has been shown here that the markings could not be significantly damaged by cleaning or scrubbing means nor by scraping off using a blade or the like.

The method according to the invention could thus be used to produce, in a simple manner, highly durable structures for any functions in particular in glass surfaces, with relatively easily modified conventional laser inscription systems being advantageously useable.

Finally, it is once again pointed out that the apparatuses shown in the figures and the concrete method which was explained in association therewith are merely exemplary embodiments which can be varied in a variety of ways by a person skilled in the art, without departing from the scope of the invention. For reasons of completeness, it is furthermore pointed out that the use of the indefinite article "a" does not exclude the relevant features from being present a plurality of times.

The invention claimed is:

1. A method for incorporating a structure into a surface of a workpiece which is transparent at a specific wavelength range, comprising:
    providing a target material having a target surface;
    bringing a surface to be structured of the workpiece into contact with the target surface of the target material,
    providing a laser beam having a wavelength range, the laser beam having a focus with a power density of more than 2000 W/mm$^2$,
    focusing the laser beam on or below the target surface, and
    shooting the laser beam through the workpiece and into a boundary region of the surface to be structured of the workpiece and the target surface at least at one position to cause the target material to be deposited in the surface to be structured of the workpiece,
    wherein shooting the laser beam is performed with a pulse repetition rate of more than 10 kHz.

2. The method as claimed in claim 1, wherein the workpiece is made of glass.

3. The method as claimed in claim 1 wherein the target material is a metal.

4. The method as claimed in claim 3, wherein the target material is a steel.

5. The method as claimed in claim 1, wherein the structure is designed for marking the workpiece.

6. The method as claimed claim 1, wherein the focus of the laser beam is moved along a structuring track, specified according to a structuring image, at an advancing rate of more than 70 mm/s.

7. The method as claimed claim 6, wherein the focus of the laser beam is moved along a structuring track, specified according to a structuring image, at an advancing rate of more than 100 mm/s.

8. The method as claimed in claim 1, wherein the shooting is carried out such that particles of the target material penetrate the surface to be structured at least at one point to a depth of at least about 15 μm.

9. The method as claimed in claim 8, wherein the shooting is carried out such that particles of the target material penetrate the surface to be structured at least at one point to a depth of at least about 30 μm.

10. The method as claimed in claim 1, wherein the laser beam is controlled such that the temperature in the surface to be structured during the shooting is below the melting temperature of the workpiece material.

11. The method as claimed in claim 1, wherein the laser beam in the focus has a power density of more than about 3 kW/mm$^2$.

12. The method as claimed in claim 11, wherein the laser beam in the focus has a power density of more than about 10 kW/mm$^2$.

13. The method as claimed in claim 12, wherein the laser beam in the focus has a power density of more than about 100 kW/mm$^2$.

14. The method as claimed in claim 1, wherein a focus diameter is less than 60 μm.

15. The method as claimed in claim 14, wherein the focus diameter is less than 40 μm.

16. The method as claimed in claim 1, wherein the pulse repetition rate is more than 20 kHz.

17. The method as claimed in claim 1, wherein a pulse duration of the laser pulses is less than 100 ns.

18. The method as claimed in claim 17, wherein the pulse duration of the laser pulses is less than 20 ns.

19. The method as claimed in claim 1, wherein a laser pulse peak power is more than 10 kW.

20. The method as claimed in claim 19, wherein the laser pulse peak power is more than 25 kW.

21. An apparatus for incorporating a structure into a surface of a workpiece which is transparent at a specific wavelength range, comprising:

- a target surface containing a target material, the target surface being in contact with the surface to be structured of the workpiece,
- a laser beam generation device generating a laser beam the wavelength of which is within the specific wavelength range, with the laser beam generation device being designed and arranged such that energy can be introduced into a boundary region of the surface to be structured of the workpiece and the target surface at least at one position using the laser beam through a workpiece which is in contact with the target surface such that at a relevant position target material is deposited in the surface to be structured, wherein the laser beam generation device is designed such that it generates a pulsed laser beam with a pulse repetition rate of more than 10 kHz and has a focussing device and a control device which focuses the laser beam during a structuring process onto or just under the target surface, the laser beam in the focus having a power density of more than 2000 W/mm$^2$.

22. The apparatus as claimed in claim 21, wherein the laser beam generation device has a beam guidance device in order to move the laser focus along a structuring track defined according to a structuring image.

\* \* \* \* \*